Figure 1:
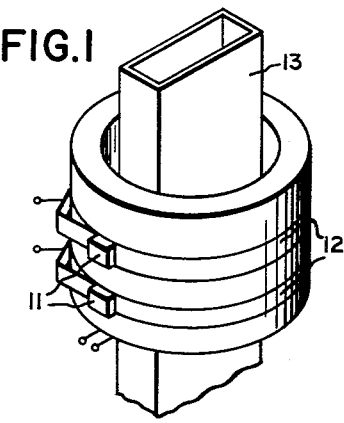

Aug. 4, 1964   J. F. GORDON   3,143,717
RING AND BRUSH ROTARY ELECTRIC COUPLING
Filed April 19, 1962   3 Sheets-Sheet 1

INVENTOR.
JAMES F. GORDON
BY
*Paul B Hunter*
ATTORNEY

Aug. 4, 1964     J. F. GORDON     3,143,717
RING AND BRUSH ROTARY ELECTRIC COUPLING
Filed April 19, 1962     3 Sheets-Sheet 2
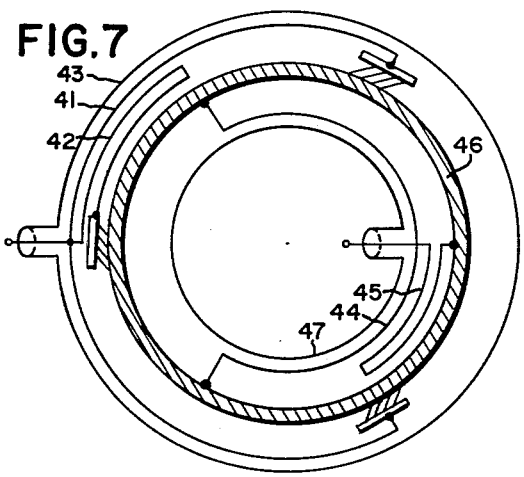
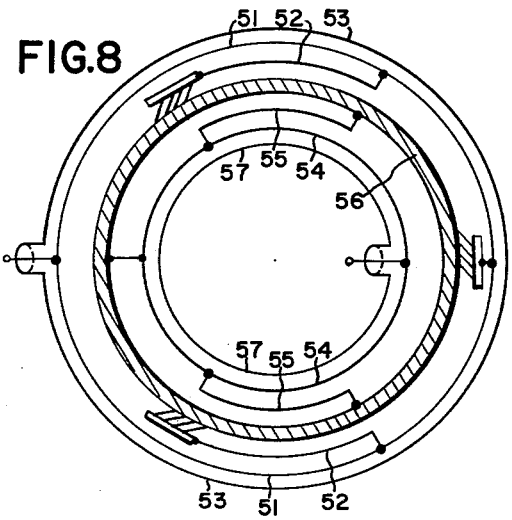
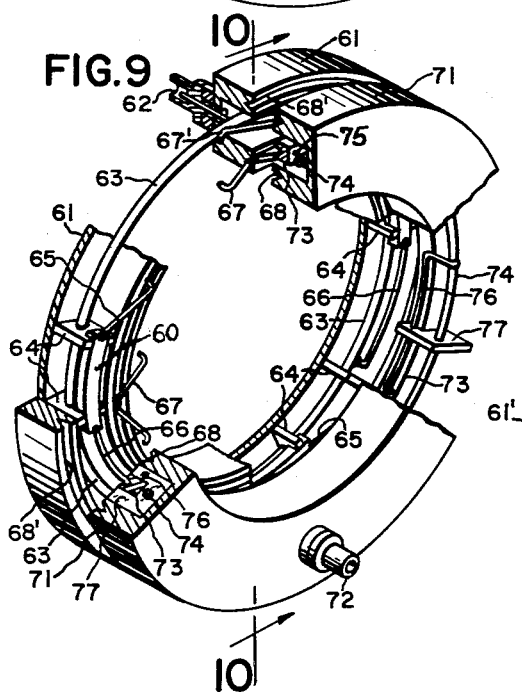
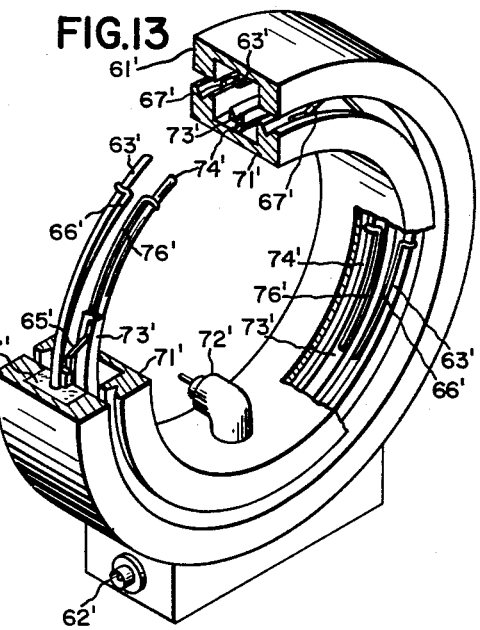
INVENTOR.
JAMES F. GORDON
BY
ATTORNEY Aug. 4, 1964    J. F. GORDON    3,143,717
RING AND BRUSH ROTARY ELECTRIC COUPLING
Filed April 19, 1962    3 Sheets-Sheet 3
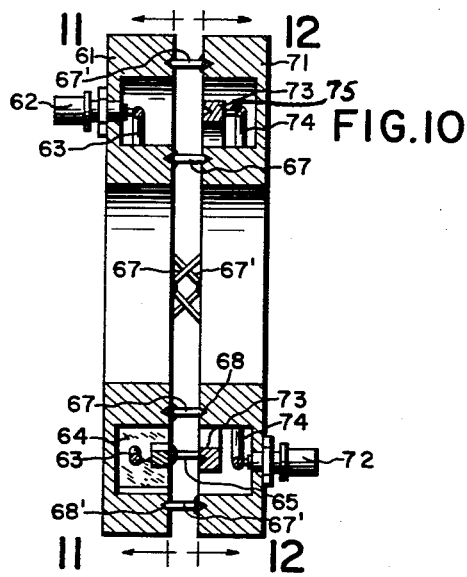
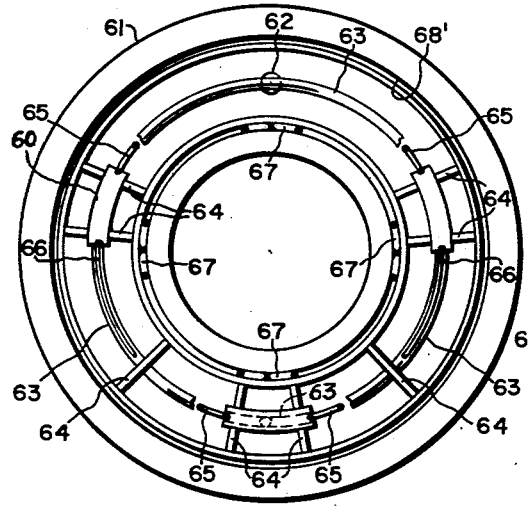
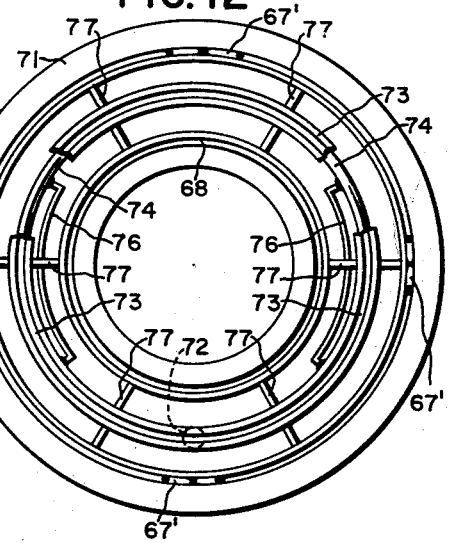
INVENTOR.
JAMES F. GORDON
BY
*Paul B. Hunter*
ATTORNEY

United States Patent Office 3,143,717
Patented Aug. 4, 1964

3,143,717
RING AND BRUSH ROTARY ELECTRIC COUPLING
James F. Gordon, Santa Ana, Calif., assignor to Pacific Scientific Company, San Francisco, Calif., a corporation of California
Filed Apr. 19, 1962, Ser. No. 188,685
12 Claims. (Cl. 333—97)

This invention relates in general to a rotary coupling means, and more particularly to an improved ring and brush rotary electric coupling for high frequency applications such as antenna mounts, centrifuges, and similar devices passing high frequencies therethrough.

Rotary electric coupling structures utilizing sets of rings and brushes are in common use and are very effective in passing electrical currents. However, difficulties occur as the frequencies of the signal passing through the rotary coupling become high. The discontinuities result from the inability of such rotary electric couplings to present a constant impedance identical to that of the transmission lines entering and leaving the rotary coupling. This increases insertion loss as well as the VSWR. Furthermore, these losses are not usually fixed losses, i.e., they become dependent upon the relative angle of the rotating section of the coupling to the fixed section of the coupling device as it rotates; thus the losses vary in a cyclical manner. Provided the rotary coupling means is in the form of a single, centrally located coaxial type coupling, it is not too difficult to obtain satisfactory performance. This type of arrangement, however, allows for only one circuit, or with a double coaxial design perhaps two. Such an arrangement prevents its use in conjunction with a centrally located waveguide or a centrally located hydraulic line, etc., that is, a line or waveguide running coaxially through the coupling structure itself. Where large diameter waveguides or pressure lines must occupy the center of the rotary coupling, the high frequency rotary circuit must be carried externally of the waveguide at a larger diameter than is desirable.

A simple rule for the design of rotary electric couplings for high frequency use using the conventional slip ring and brush arrangement is to keep a ratio of wavelength (at the highest frequency to be transmitted) to slip ring diameter of at least 200 to 1. For example, $$\text{Wavelength in feet} = \frac{984.24}{\text{frequency in megacycles}}$$

At 50 megacycles $$\lambda = \frac{984.24}{50} = 19.6848 \text{ ft.}$$

$$\frac{19.6848}{200} = .098 \text{ ft.} = 1.076 \text{ in.} = \text{maximum diameter}$$

This maximum diameter limitation will assure a VSWR less than 1.1 to 1 at 50 megacycles for a 50 ohm input and output provided that good design practice is used for brush and ring termination.

An increasing degradation of VSWR occurs as the diameter increases. To some extent this can be reduced by careful attention to slip ring capacitance. The changing length of the slip ring relative to the point of brush contact during rotation, however, establishes a variable inductance which becomes difficult and, in many cases, impossible to compensate for without serious insertion loss.

It is, therefore, the object of the present invention to provide a novel electrical rotary coupling means which may be large in diameter and yet capable of passing high frequency signals with a minimum of insertion loss and VSWR changes during rotation.

One feature of the present invention is the provision of a ring and brush type electric rotary coupling wherein each of the input and output coaxial type transmission lines are divided into a plurality of sections which are connected to a plurality of associated ring and brush contacts, these ring and brush contacts being spaced circumferentially around the coupling so as to reduce the distance of travel of the brush between ring contacts.

Another feature of the present invention is to provide an electric rotary coupling of the above featured type wherein the coupling may be arranged such that the outer conductors for the ring and the brush structures serve to support and house the inner conductors thereof.

Figure 2:
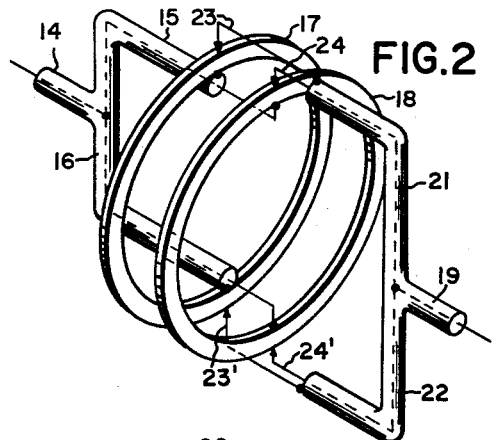
Figure 3:
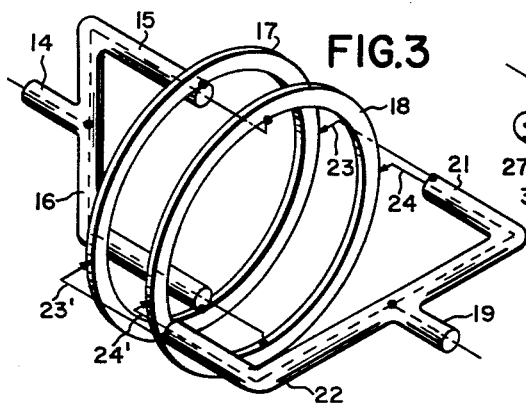
Figure 4:
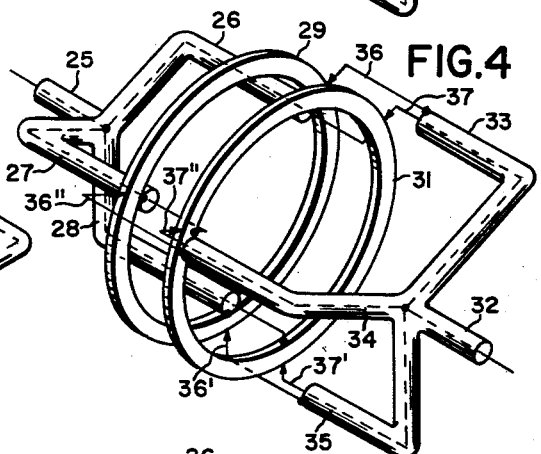
Figure 5:
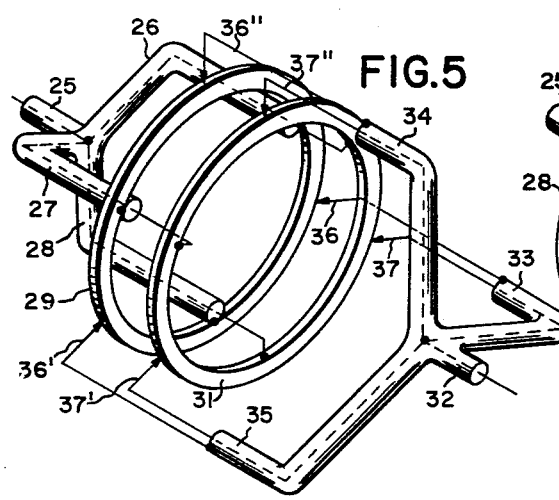
Figure 6:
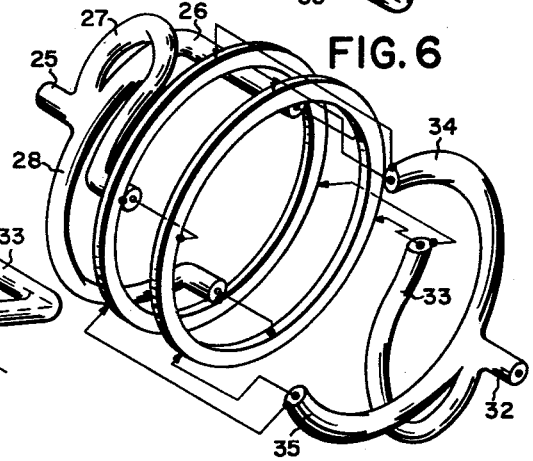

These and other features and advantages of the present invention will become more apparent upon a perusal of the following specification taken in connection with the drawings, wherein:

FIG. 1 is a perspective view of a conventional form of ring and brush type rotary coupling, FIG. 2 is a perspective view of a form of rotary coupling for passing high frequency signals which embodies the present invention, FIG. 3 shows the slip ring structure of FIG. 2 with the brushes rotated 90 degrees, FIG. 4 is a perspective view of another form of high frequency slip ring of the present invention, FIG. 5 is a perspective view of the slip ring structure of FIG. 4 with the brushes rotated 90 degrees, FIG. 6 is a perspective view of a practical construction for the slip ring device of FIGS. 4 and 5, FIGS. 7 and 8 show in diagrammatic form two modifications of the brush and ring structure shown in FIG. 6, FIG. 9 is a perspective view partially cut away of a practical brush and ring type rotary coupling embodied in the present invention, this arrangement being cylindrical in form, FIG. 10 is cross-sectional view of the slip ring structure of FIG. 9 taken along line 10—10, FIGS. 11 and 12 are cross-sectional views taken along lines 11—11 and 12—12, respectively, in FIG. 10, and FIG. 13 is another form of structure of the rotary coupling of the present invention, only coaxial in form.

Referring now to FIG. 1, there is shown a slip ring device of known structure wherein the brushes 11 and cooperating rings 12 are located on a hollow cylindrical structure which permits a central opening space for passing a waveguide 13 or the like. As discussed above, as the diameter of this structure increases to permit larger sized waveguides or other members to pass centrally therethrough, the undesirable discontinuities arise in the coupling characteristics.

In FIG. 2 there is shown a ring and brush arrangement in schematic form which will serve to minimize the variation in inductance during rotation of the brushes relative to the rings. In this embodiment, the coaxial line 14 of the ring structure is divided into two terminal leads 15 and 16, the outer conductors of which are connected to one ring 17 and the inner conductors of which are connected to the second ring 18. The output or brush terminal line 19 is also divided into two sections 21 and 22, the outer conductors of which are connected to the brushes 23 and 23' and the inner conductors of which are connected to the brushes 24 and 24', respectively. It is possible by this means to enter on a cable 14, for example 50 ohms, divided into two 100-ohm sections of cable 15 and 16 attached to the rings at 180-degree spaced-apart points and exit from brushes placed at 180 degrees from each other which are also connected by 100-ohm cable sections 21 and 22 leading into a single 50-ohm output line 19.

It will be noted that when the brushes 23, 23', 24, 24' are directly above the points at which the connections are made to the rings 17 and 18 (the position shown in FIG. 2), the best match would occur if the rings were actually removed and the cables connected directly. Since the device must rotate, this is, of course, not practical. Consider the condition where the two sets of brushes are rotated 90 degrees with respect to the position shown in FIG. 2. This particular arrangement is shown in FIG. 3. The slip rings are now a part of the active transmission path, and if the slip ring sections represent an impedance match between the 100-ohm sections, the losses will be minimized. The slip rings, however, represent a transmission line terminated in itself, so that it is essentially short circuited for lower frequencies and self resonant at higher frequencies and cannot function strictly as its configuration would imply on a casual observation. As a transmission line, its physical length for any two opposite connected terminals then becomes one-half of the total circumference. Under these circumstances the capacitance per unit length is doubled, the inductance per unit length is halved, and the operation is restricted to frequencies below the resonant frequencies of the slip rings so disposed. If the slip ring section under the above circumstances appears as 200 ohms, then at the position in FIG. 3 something approaching a good match is definitely possible. At the postion of FIG. 2, as has been previously stated, however, the slip rings are "excess baggage," and it would be better at this point if they exhibited the highest possible impedance. A compromise is desirable then, and the resulting impedance of the slip ring section is raised to some value above 200 ohms. Since both ring and brush connections are symmetrical, the greatest mismatch occurs between the 90-degree points of relative rotation shown in FIGS. 2 and 3, and the magnitude of inductance change (minimum to maximum) during 360 degree rotation is minimized. This allows a considerable increase in diameter within which a good VSWR may be obtained, or conversely an increase in frequency over that established for a given diameter by the ordinary approach shown in FIG. 1.

It is possible to carry the method of FIGS. 2 and 3 still further in order to reduce the effect of rotational variations by dividing the input and output lines into three symmetrical sections. This is shown in FIG. 4 wherein the 50 ohm input line 25 is divided into three 150 ohm sections 26, 27, and 28, the outer conductors of which are electrically connected to ring 29 at equally spaced apart points and the inner conductors of which are electrically connected to ring 31. The output line 32 is likewise divided into three sections 33, 34, 35, the outer conductors of which are connected to brushes 36, 36', 36" associated with ring 29, and the inner conductors of which are connected to brushes 37, 37', and 37" associated with ring 31. Minimum and maximum changes occur now at 60-degree points rather than at 90-degree points; and the upper frequency limit for a given diameter and the VSWR is further increased. The 60-degree rotational minimum and maximum situation is shown in FIG. 5.

Some awkward construction problems exist in the application of this method to a practical working device. It is desirable to have the coaxial input and output located near the outside of the assembly in order to leave a free opening to pass other structure through the center of the coupling. This would then require the physical arrangement shown in FIG. 6 wherein the main lines 25 and 32 are each off to one side. To keep each of the 150-ohm sections of line identical is somewhat of a problem and the structure becomes clumsy. It also implies the use of coaxial line impedances which are not standardized items.

The embodiment shown diagrammatically in FIG. 7 is a compromise in which the slip ring channel (the channel forming the outer conductor of the line) also accommodates or houses the feed line sections. For simplicity, the outer conductor slip ring and associated brushes are not shown in FIG. 7. The inner conductor brush feed-in line sections 41 and 42 share a common outer conductor 43, line 42 doubling back to provide the necessary length to the line 42. The inner conductor ring feed-in line sections 44 and 45 connected to ring 46 also share a common outer conductor 47. Arranging the slip ring channel so that in houses the feed line sections reduces the bulk of the rotary coupling and simplifies the feed-line sections but at the expense of creating additional discontinuities. A third of the slip ring area is exposed to a different value of capacitance during rotation. This procedure of putting the line sections within the slip ring as well as the brush channel upsets the desirable symmetry that is shown in FIG. 4. These problems give rise to the embodiment shown in FIG. 8, in which these latter discontinuities are minimized. The capacitance between brushes and rings now remains constant during relative motion through 360 degrees. Electrical symmetry exists with respect to brush and ring connecting points with only a minimum of mismatch. The brush line sections 51 and 52 share a common section of outer conductor 53, and the ring line sections 54 and 55 connected to ring 56 share a common section of outer conductor 57.

Referring now to FIGS. 9, 10, 11, and 12, there is shown a practical slip ring structure made in accordance with the present invention. The brush structure comprises an annular member or ring 61 of U-shaped cross section to which input power is fed through a coaxial line type of brush connector 62. The outer conductor of this connector 62 is electrically connected with the ring 61 while the inner conductor of the connector is insulated from the ring 61, and is electrically connected to a circular main brush feed line 63 which circles around within the inner channel of the ring 61 and is mounted on and insulated from the brush ring by insulating mounts 64 spaced at suitable locations around the ring 61. The main brush feed line 63 has three center conductor brushes 65 electrically connected therewith, these brushes 65 being mounted on the supporting insulators 64 with the aid of metal straps 60. One of the center conductor brushes 65 is positioned 180 degrees away from the brush connector 62; the other two center conductor brushes are positioned 120 degrees away from said one center conductor brush, one on either side thereof, and are connected to the main brush feed line 63 by secondary brush feed lines 66, which are connected to the main brush feed line at points 60 degrees removed from said first center conductor brush. The locations of these points of contact and connection can also be seen in FIG. 8. It should be noted that the apparatus shown in FIGS. 7 through 13 does not depict the true relative sizes in actual use; for example, the ratio of the inner diameter of the annular assembly to the outer diameter in actual assemblies is considerably greater than the ratio shown in the drawings since the central opening was purposely drawn small to give more space to show the rings, brushes, etc.

The brush outer conductor ring 61 carries four outer conductor brushes 67 spaced at 90 degree intervals around the ring 61, these brushes fitting within a brush groove 68 in a ring outer conductor comprising an annular member 71 having a U-shaped cross-section. The member 71 also carries four brushes 67' which run in a groove 68' in ring 61. A coaxial type of ring connector 72 is connected to this ring outer conductor 71, the outer conductor of this connector being connected directly to the ring 71 while the inner conductor is insulated from the ring 71 and is electrically connected to a center conductor slip ring 73 by means of a main ring feed line 74. The main ring feed line 74 is connected directly to the center conductor slip ring by a strap 75 at a point 180 degrees removed from the ring connector 72. The main ring feed line 74 is also connected to the center conductor slip ring 73 at two other points 120 degrees removed on either side from the first mentioned connection, these latter connections being made by two secondary ring feed lines 76 which extend 60 degrees along but spaced from the center conductor slip ring 73. Insulators 77 serve to support the slip ring 73 and feed line 74 within ring 71. The groove in slip ring 73 accommodates the brushes 65.

Referring to FIG. 13, there is shown a slip ring structure similar to that shown in FIGS. 9, 10, 11, and 12, except that it is arranged with the brush and ring sections in coaxial relationship rather than side-by-side. Similar functioning elements bear the same reference numerals as those in FIGS. 9, 10, 11, and 12, except that they have been primed.

One form of slip ring coupling made in accordance with the present invention had an outside diameter of 8.5 inches and performed very well at 50 to 100 megacycles. Whereas with the regular uncompensated slip ring approach the wavelength to diameter ratio for good VSWR performance is held to 200:1, it becomes possible with the present invention to reduce the ratio considerably, for example 10:1. This represents an increase of twenty times the diameter for comparable VSWR, or conversely an increase of twenty times in the frequency for some configurations.

Although the slip rings of FIGS. 9 and 13 utilize three feed points per ring, it may be desirable at times to change this number. For example, four feed points spaced 90 degrees apart could result in a larger diameter structure, although the added problems in manufacture and adjustment may outweigh the advantages.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A rotary coupling comprising a ring structure and a brush structure, said ring structure including a pair of electrically conducting rings, an electrical transmission line coupling for said ring structure including a two-conductor transmission line, a first one of the conductors in said two-conductor line being coupled to a first one of said pair of rings, a second one of the conductors in said two-conductor line being electrically connected with a second one of said rings at a plurality of points equally spaced around said second ring, said brush structure including two sets of electrically conducting brushes contacting said electrically conducting rings, an electrical transmission line coupling for said brush structure including a two-conductor transmission line, a first one of the conductors of said latter two-conductor line being coupled to a first set of brushes contacting said first ring, and a second one of the conductors of said latter two-conductor line being coupled to a second set of brushes contacting said second ring at a plurality of points equally spaced around said second ring.

2. A rotary coupling comprising a ring structure and a brush structure, said ring structure including a pair of electrically conducting rings, an electrical transmission line coupling for said pair of rings including a two-conductor transmission line, said two-conductor transmission line branching off into a plurality of separate two-conductor sections, corresponding conductors in each section being coupled to a first one of said rings, said corresponding conductors in the separate sections being equally spaced around said first ring, said remaining conductors of said sections being connected at equally spaced points around said second ring, said brush structure including a first plurality of brushes contacting said first ring at equally spaced apart points and a second plurality of brushes contacting said second ring at equally spaced apart points, an electrical transmission line coupling for said brushes including a two-conductor transmission line branching off into a plurality of separate two-conductor sections, corresponding conductors in said latter two-conductor sections being connected to separate ones of said brushes in said first plurality of brushes and the remaining conductors in said latter two-conductor sections being connected to separate ones of brushes in said secondary plurality of brushes.

3. A rotary coupling as claimed in claim 2 wherein said plurality of transmission line sections in each of said ring and brush transmission lines consists of two sections.

4. A rotary coupling as claimed in claim 2 wherein said plurality of transmission line sections in each of said ring and brush transmission lines comprises more than two sections.

5. A rotary coupling as claimed in claim 2 wherein said plurality of transmission line sections in each of said ring and brush transmission lines are of substantially equal electrical length.

6. A rotary coupling comprising a ring structure and a brush structure, said ring structure comprising an outer conductor ring and an inner conductor ring, an electrical transmission line coupling for said ring structure including an outer conductor and an inner conductor, means for electrically connecting said outer conductor to said outer conductor ring at a plurality of spaced-apart points on said outer conductor ring and for electrically connecting said inner conductor to said inner conductor ring at a plurality of spaced-apart points on said inner conductor ring, said brush structure comprising a plurality of outer conductor brushes contacting said outer conductor ring at a plurality of spaced-apart points and a plurality of inner conductor brushes contacting said inner conductor ring at a plurality of spaced-apart points, an electrical transmission line coupling for said brush structure including an outer conductor and an inner conductor, and means for electrically connecting said latter outer conductor to said plurality of outer conductor brushes and for electrically connecting said latter inner conductor to said plurality of inner conductor brushes.

7. A rotary coupling as claimed in claim 6 wherein said means for connecting said outer and inner conductors to said outer and inner conductor rings and for connecting said latter outer and inner conductors to said outer and inner conductor brushes comprise two-conductor transmission lines of substantially equal electrical length.

8. A rotary coupling comprising a ring structure and a brush structure, said ring structure comprising an outer conductor ring having an annular channel therein and an inner conductor ring insulatingly mounted within said annular channel and spaced apart from said outer conductor ring, an electrical transmission line coupling for said ring structure including an outer conductor electrically connected to said outer conductor ring and an inner conductor extending into said channel and connecting with said inner conductor ring at a plurality of spaced-apart points around said ring, said brush structure comprising an outer conductor annular member having an annular channel therein which faces said annular channel in the outer conductor ring and a plurality of brushes insulatingly mounted in said annular channel in said outer conductor annular member, said brushes being spaced apart around said channel, said outer conductor annular member and associated brushes being arranged to rotate relative to said outer conductor ring and said inner conductor ring, means for providing a sliding contact between said outer conductor ring and outer conductor annular member, said brushes slidably engaging said inner conductor ring, and an electrical transmission line coupling for said brush structure including an outer conductor electrically connected to said outer conductor member and an inner conductor extending into the channel in said outer conductor member and electrically connecting with said plurality of spaced-apart brushes.

9. A rotary coupling as claimed in claim 8 wherein said outer conductor ring and said outer conductor annular member are positioned side-by-side, the annular channels being located in the sides of said ring and annular member with their openings facing one another.

10. A rotary coupling as claimed in claim 8 wherein said outer conductor ring and said outer conductor annular member are positioned coaxially with said channel openings facing in a radial direction.

11. A rotary coupling as claimed in claim 8 wherein said electrical transmission line coupling for connecting with said inner conductor ring includes an annular main ring feed line insulatingly mounted in the annular channel and a plurality of secondary feed lines for connecting said main ring feed line to said inner conductor ring, and wherein said electrical transmission line coupling for connecting with said plurality of spaced-apart brushes includes an annular main brush feed line insulatingly mounted in the channel in said outer conductor member and a plurality of secondary feed lines for connecting said main brush feed line to said brushes.

12. A rotary coupling as claimed in claim 11 wherein said secondary feed lines connect points on said main ring and brush feed lines to points on the associated inner conductor ring and brushes, respectively, which points are circumferentially spaced apart.

References Cited in the file of this patent

UNITED STATES PATENTS 2,975,382    Fromm et al. _____ Mar. 14, 1961